United States Patent
Uno et al.

(10) Patent No.: US 7,755,819 B2
(45) Date of Patent: Jul. 13, 2010

(54) HOLOGRAM RECORDING DEVICE (75) Inventors: Kazushi Uno, Kawasaki (JP); Kouichi Tezuka, Kawasaki (JP); Hiroyasu Yoshikawa, Kawasaki (JP); Yasumasa Iwamura, Kawasaki (JP); Yuzuru Yamakage, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/048,935

(22) Filed: Mar. 14, 2008

(65) Prior Publication Data
US 2008/0198429 A1      Aug. 21, 2008

Related U.S. Application Data (63) Continuation of application No. PCT/JP2005/017027, filed on Sep. 15, 2005.

(51) Int. Cl.
*G03H 1/10*      (2006.01)
(52) U.S. Cl. ............................. 359/10; 359/21; 359/30
(58) Field of Classification Search ................... None
See application file for complete search history.

(56) References Cited

U.S. PATENT DOCUMENTS 6,958,967 B2   10/2005   Kasazumi et al.
7,187,481 B1 *  3/2007   Sigel et al. ............... 359/28
7,202,919 B2 *  4/2007   Edwards ................... 349/25
7,298,532 B2 * 11/2007   Thomas et al. ............ 359/9

FOREIGN PATENT DOCUMENTS

| JP | A 11-16373   | 1/1999  |
| JP | A 2002-216359 | 8/2002  |
| JP | A 2004-354713 | 12/2004 |

* cited by examiner

*Primary Examiner*—Stephone B Allen
*Assistant Examiner*—Derek S Chapel
(74) *Attorney, Agent, or Firm*—Greer, Burns & Crain, Ltd.

(57) ABSTRACT

A hologram recorder (A2) includes: a light source (10) for emitting a coherent beam; a spatial light modulator (20) provided with unit areas having a plurality of beam reflection elements (21) to reflect the beam from the light source (10) in a main direction as a signal beam or a cut-off direction; and a signal beam optical system (30, 31) for directing the signal beam to the hologram recording medium (B). The recorder (A2) further includes: a wavefront reshaper (40, 41, 42) for condensing the beams thinned out in the cut-off direction by the beam reflection element (21) of the modulator (20), and reshaping the wavefront of the condensed beams; and a reference beam optical system (50, 51) for directing the beam from the reshaper (40, 41, 42) to the recording medium (B) as a reference beam to be shone in an overlapping manner with the signal beam.

1 Claim, 9 Drawing Sheets

HOLOGRAM RECORDING DEVICE

This application is a continuation of International Application No. PCT/JP2005/017027, filed Sep. 15, 2005.

FIELD OF THE INVENTION

The present invention relates to hologram recorders for recording holograms by using a signal beam and a reference beam shone onto a recording medium in an overlapping manner.

BACKGROUND ART

A conventional hologram recorder is disclosed in Patent Document 1 for example. In the hologram recorder, a laser beam from a light source is split by a half mirror in two directions. One of the split beams is modulated by a spatial light modulator which is provided by a liquid-crystal device. The spatial light modulator modulates the beam into a discrete beam which provides a digital (light and dark) pixel pattern in accordance with the information to be recorded. This beam is shone as a signal beam to a hologram recording medium. The other of the beams split by the half mirror is shone as a reference beam so that it will overlap with the signal beam on the hologram recording medium. Through this process, a hologram is recorded in the hologram recording medium, as an interference stripe pattern made by the signal beam and the reference beam.

Patent Document 1: JP-A-2002-216359

In the above-described conventional hologram recorder, the spatial light modulator thins the signal beam discretely so that the beam makes a light-and-dark pixel pattern. The thinning of the beam, however, results in a large beam loss in the spatial light modulator.

Specifically, it is assumed, for example, that the amount of beam taken out for power monitoring is 15% of the initial amount of beam emitted from the light source; a ratio between the amount of signal beam and the amount of reference beam which reach the medium is 1:2; the transmissivity in each pixel of the spatial light modulator is 80%, and the spatial light modulator uses a 2-4 coding scheme (i.e. only one pixel out of each four-pixel block takes a bright state to express a two-bit code) for forming a light-and-dark pixel pattern, meaning that the ratio of light-transmitting area in an effective pixel area is 25%; and all the other losses in the amount of beam caused by the half mirror and so on are negligible. In this case, the amount of reference beam to reach the hologram recording medium is 24.3%, the amount of beam to enter the spatial light modulator is 60.7%, and the amount of signal beam to come out of the spatial light modulator and reach the medium is 12.1%. Thus, the beam loss at the spatial light modulator is 48.6% (=60.7%-12.1%), which means that approximately a half of the light emitted from the light source will be lost.

DISCLOSURE OF THE INVENTION

The present invention has been proposed under the above-described circumstances. It is an object of the present invention to provide a hologram recorder which is capable of reducing beam loss and improving beam utilization efficiency.

In order to solve the above-described problems, the present invention makes use of the following technical means:

A hologram recorder according to a first aspect of the present invention comprises: a light source for emission of a coherent beam; a spatial light modulator including unit areas provided with beam reflection elements, respectively, each of the beam reflection elements configured to reflect the coherent beam from the light source in a main direction as a signal beam or in a cut-off direction; and a signal beam optical system for directing the signal beam to a hologram recording medium. The hologram recorder of the first aspect further comprising: a wavefront reshaper for concentration and wavefront reshaping of beams reflected in the cut-off direction by the beam reflection elements of the spatial light modulator; and a reference beam optical system for directing a beam from the wavefront reshaper to the hologram recording medium as a reference beam to overlap with the signal beam on the hologram recoding medium.

Preferably, the wavefront reshaper may include a condenser lens for condensation of a beam, an optical filter at a focal point of the condenser lens, and a collimator lens for collimating a beam from the optical filter.

Preferably, the above hologram recorder may further comprise a power-monitoring light sensor for monitoring an output state of the light source. The optical filter may be provided with a central transmissive part and a peripheral reflective part around the central transmissive part, where the central transmissive part allows a beam of a low-frequency component to pass through to the collimator lens, and the peripheral reflective part reflects a beam of a high-frequency component to the power-monitoring light sensor.

Alternatively, the above recorder may further comprising a power-monitoring light sensor for monitoring an output state of the light source, where the optical filter is provided with a central reflective part and a peripheral transmissive part around the central reflective part. The central reflective part reflects a beam of a low-frequency component to the collimator lens, while the peripheral transmissive part allows a beam of a high-frequency component to pass through to the power-monitoring light sensor.

Preferably, the optical filter may be provided with a pinhole for allowing a beam of a low-frequency component to pass through to the collimator lens.

Preferably, the above hologram recorder may further comprise a power-monitoring light sensor for monitoring of an output state of the light source, where the reference beam optical system is provided with a half mirror for reflecting or passing part of a beam from the collimator lens to the power-monitoring light sensor.

A hologram recorder according to a second aspect of the present invention comprises: a light source for emission of a coherent beam; a beam splitter for splitting the beam from the light source in two directions; a spatial light modulator including unit areas provided with beam reflection elements, respectively, each of the beam reflection elements configured to reflect a beam split by the beam splitter in a main direction as a signal beam or in a cut-off direction; a signal beam optical system for directing the signal beam to a hologram recording medium; a reference beam optical system for directing another beam split by the beam splitter to the hologram recording medium as a reference beam to be shone in an overlapping manner with the signal beam on the hologram recording medium; and a power-monitoring light sensor for monitoring an output state of the light source. The hologram recorder further comprise a power monitoring optical system for condensing and directing beams thinned out in the cut-off direction by the beam reflection elements of the spatial light modulator to the power-monitoring light sensor.

A hologram recorder according to a third aspect of the present invention comprises: a light source for emission of a coherent beam; a beam splitter for splitting the beam from the light source in two directions; a spatial light modulator including unit areas provided with beam reflection elements, respectively, each of the beam reflection elements configured to reflect a beam split by the beam splitter in a main direction as a signal beam or in a cut-off direction; a signal beam optical system for directing the signal beam to a hologram recording medium; a reference beam optical system for directing another beam split by the beam splitter to the hologram recording medium as a reference beam to be shone in an overlapping manner with the signal beam on the hologram recording medium; and a servo control light sensor for controlling a position or attitude of the signal beam optical system and the reference beam optical system relative to the hologram recording medium. The hologram recorder further comprises: a wavefront reshaper for condensation and wavefront reshaping of beams thinned out in the cut-off direction by the beam reflection elements of the spatial light modulator; and a servo optical system for directing a beam from the wavefront reshaper to the hologram recording medium as a servo beam and directing a returning beam from the hologram recording medium to the servo control light sensor.

Preferably, the wavefront reshaper may include a condenser lens for condensation of a beam, an optical filter at a focal point of the condenser lens, and a collimator lens for collimating a beam from the optical filter.

Preferably, the optical filter may be provided with a pinhole for allowing a beam of a low-frequency component to pass through to the collimator lens.

BEST MODE FOR CARRYING OUT THE INVENTION

Preferred embodiments of the present invention will be described below with reference to the drawings.

FIG. 1 through 5 show a hologram recorder according to a first embodiment of the present invention.

Figure 1:
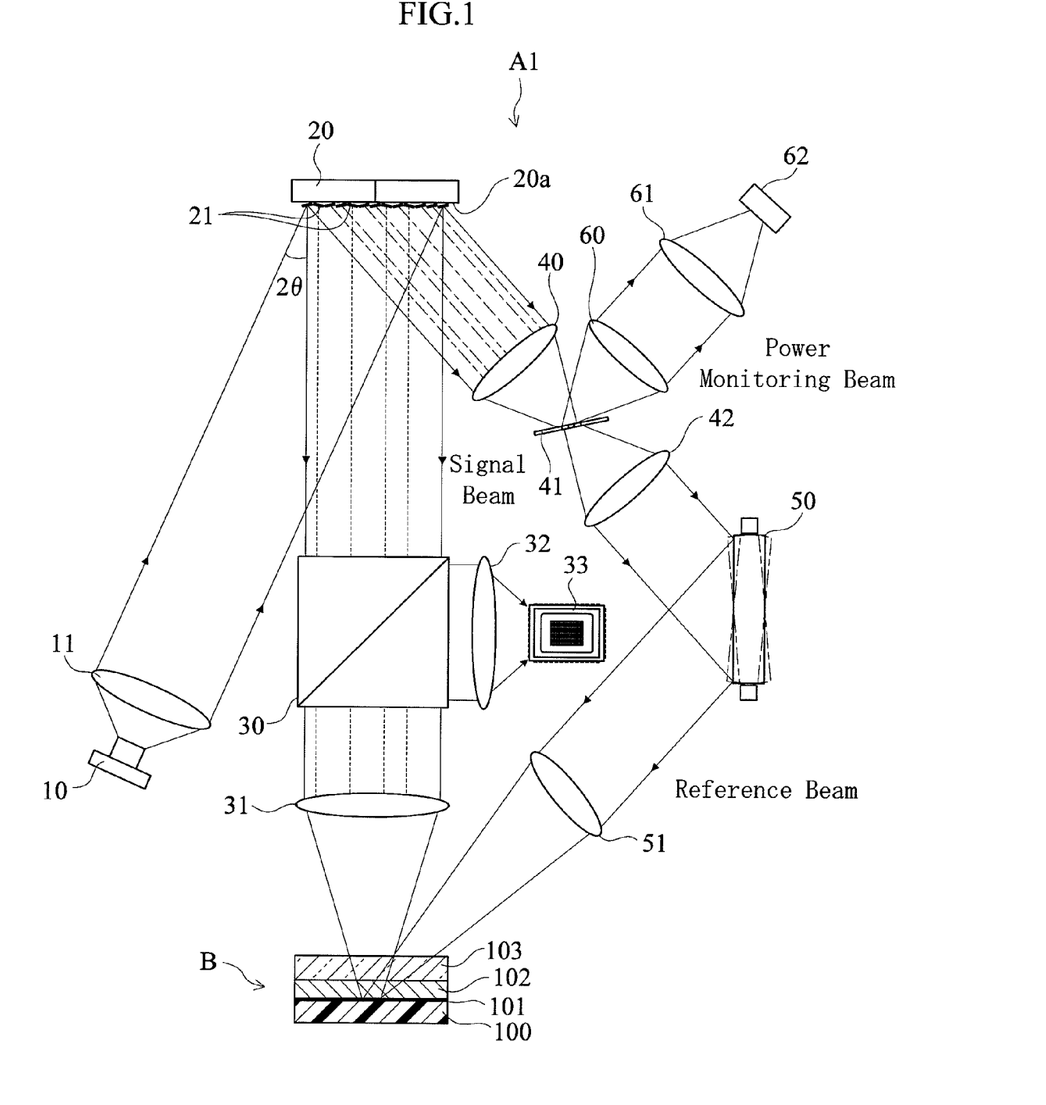
FIG. 1 is a schematic view showing the configuration of a hologram recorder according to a first embodiment of the present invention.

As shown in FIG. 1, a hologram recorder A1 is apparatus for recording holograms on a disc-shaped hologram recording medium B (only partially shown in the figure), and reconstructing the recorded holograms. The hologram recorder A1 includes a light source 10, a collimator lens 11, a spatial light modulator 20, a half mirror 30 and an object lens 31 of an optical system for signal/reconstruction beam, a condenser lens 32 of an optical system for reconstruction beam, a reconstruction light sensor 33, a condenser lens 40, an optical filter 41 and a collimator lens 42 for wavefront reshaping, a galvanomirror 50 and an object lens 51 of an optical system for reference beam, relay lenses 60, 61 of a power monitoring optical system, and a power-monitoring light sensor 62. Further, though not shown in the figure, the hologram recorder A1 is provided with a drive mechanism for rotating the hologram recording medium B, and a servo mechanism for conducting the position and attitude control of the object lenses 31, 51 relative to the hologram recording medium B.

The hologram recording medium B has a laminate structure including, for example, a support substrate layer 100, a reflection layer 101, a hologram recording layer 102, and a transparent substrate layer 103 laminated in this order. On the hologram recording layer 102, a hologram as an interference stripe pattern is recorded when a signal beam and a reference beam are shone in an overlapping manner. The reflection layer 101 is formed with emboss pits (not illustrated), which give basis for servo control operations such as track control, focus control and tilt control which are performed in response to the change in the reflected beam.

The light source 10, which is provided by a semiconductor laser device for example, emits a laser beam which has a relatively narrow band and a highly interfering nature. The collimator lens 11 converts the laser beam from the light source 10 into a parallel beam. The parallel beam coming out of the collimator lens 11 travels to the spatial light modulator 20.

Figure 2:
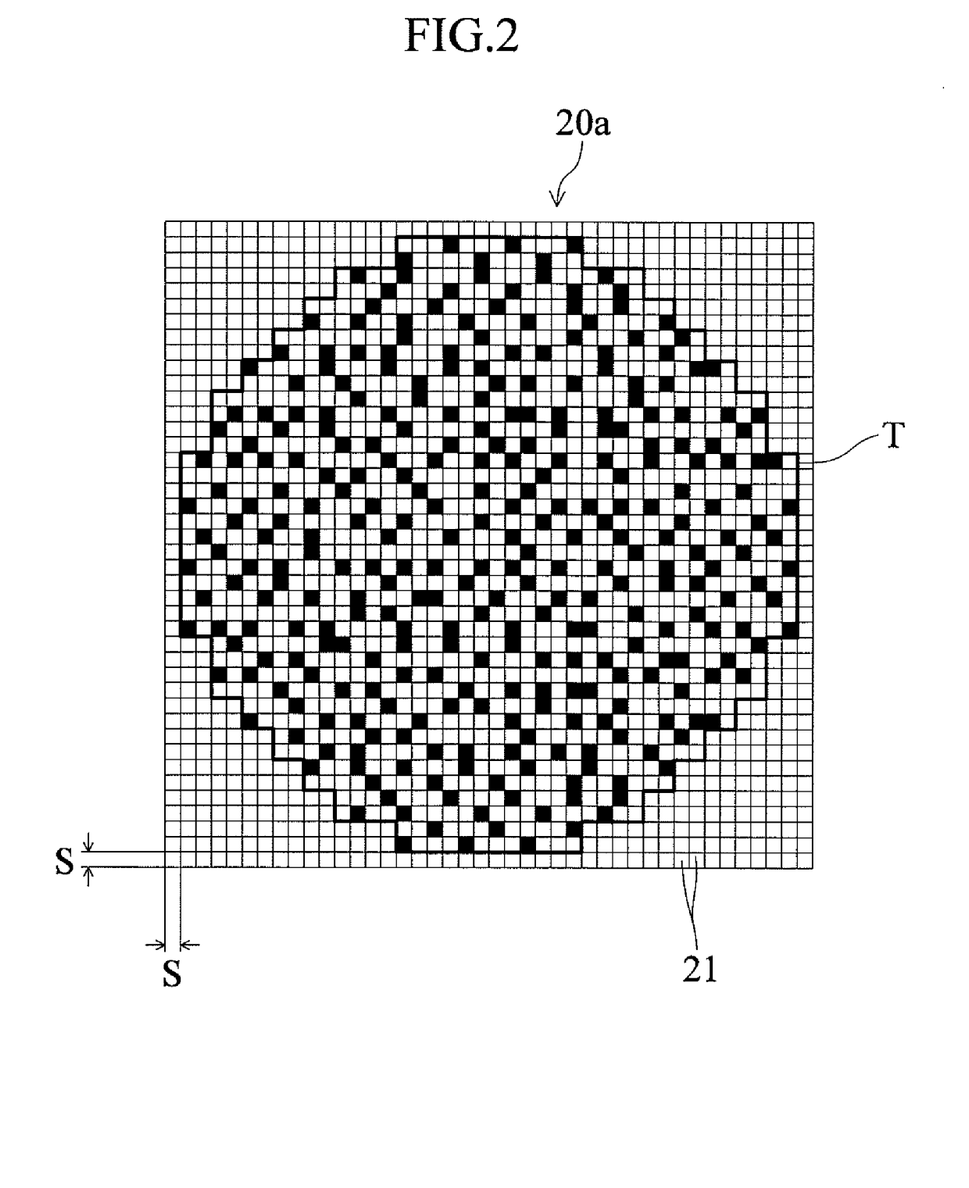
FIG. 2 is a plan view of the spatial light modulator shown in FIG. 1.
Figure 3:
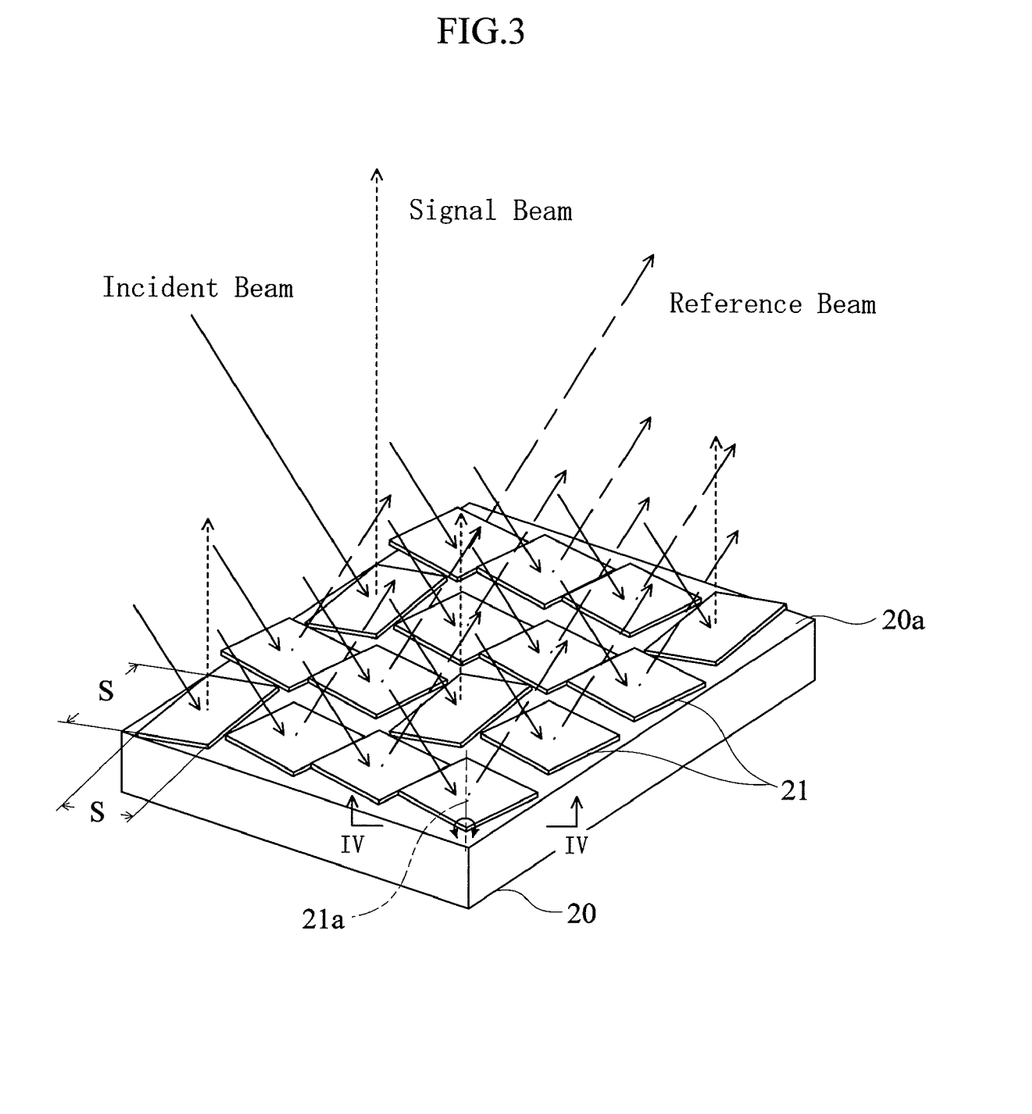
FIG. 3 is a perspective view showing some parts of the spatial light modulator in FIG. 1.
Figure 4:
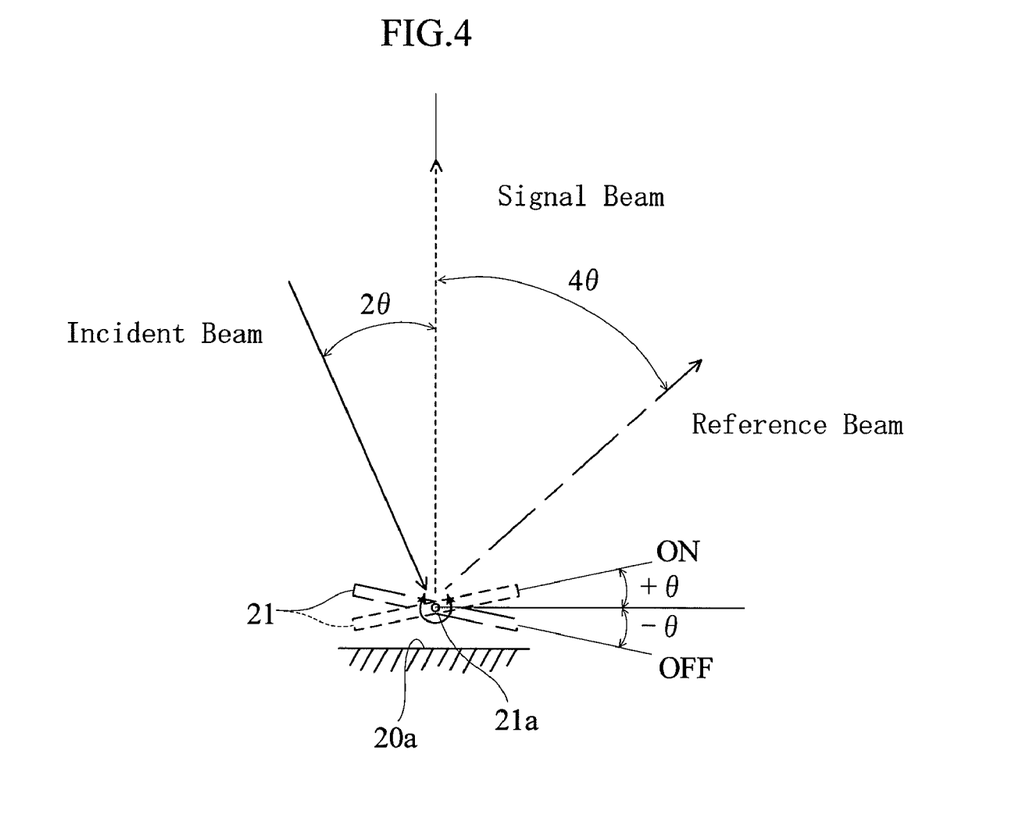
FIG. 4 is a sectional view taken along lines IV-IV in FIG. 3.

As shown in FIG. 2 and FIG. 3, the spatial light modulator 20 comprises a deformable mirror device including an array of a large number of beam reflection elements 21 disposed on a main surface 20a. The main surface 20a of the spatial light modulator 20 is substantially parallel to the hologram recording medium B. As shown in FIG. 4, the beam reflection element 21 is pivoted about a diagonal pivot axis 21a to predetermined ON/OFF angles $+\theta/-\theta$. Among the incident beams, a beam reflecting on the beam reflection element 21 at the ON angle $+\theta$ becomes a signal beam to travel in the main direction perpendicular to the hologram recording medium B. On the other hand, a beam reflecting on the beam reflection element 21 at the OFF angle $-\theta$ travels in a cut-off direction different from the main direction, and utilized as a reference beam (to illuminate the hologram recording medium B in a manner overlapping with the signal beam) or as a beam for power monitoring. In this situation, the incident beam has an angle of $2\theta$ with respect to the normal line of the main surface 20a, the signal beam travels in the direction parallel to the normal line of the main surface 20a, and the reference beam and other beams travel in the cut-off direction that makes an angle of $4\theta$ with respect to the normal line of the main surface 20a.

The spatial light modulator 20 as described above generates a discrete beam which provides a digital (light and dark) pixel pattern in accordance with the information to be recorded. As shown in FIG. 2 as an example, the present embodiment uses a 2-4 coding scheme, i.e., a two-bit coding scheme as a method of forming a light-and-dark pixel pattern in which four beam reflection elements 21 constitute a block, and only one of the beam reflection elements 21 in each block takes a bright state in the expression of two-bit code. In FIG. 2, beam reflection elements 21 which take the bright state and produce signal beams are represented by solid black tiles, whereas beam reflection elements 21 which take the dark state and produce reference beams or other beams are represented by white tiles. The coding efficiency remains the same if the bright pixels and the dark pixels are reversed. According to this 2-4 coding scheme, the area which produces the signal beam (the black tile area in FIG. 2) in an effective pixel area T will always account for 25% whereas the area which produces the reference beam, etc. (the white tile area in FIG. 2) will always be 75%. In this connection, the fill factor, which indicates an effective reflection rate for each beam reflection element 21, is approximately 80%. As shown in FIG. 2, in an instance where the beam reflection element 21 has a length and a width of S, and its area is equal to S×S, the effective reflection area is approximately 0.8 S.

The signal beam, coming out of the spatial light modulator 20 in the normal-line direction of the main surface 20a (in the main direction), passes through the half mirror 30, then through the object lens 31 in the signal/reconstruction beam optical system and then illuminates the hologram recording medium B. In reconstructing images, the reference beam interferes with the hologram on the recording medium B, thereby generating a reconstruction beam. The reconstruction beam then travels through the object lens 31, the half mirror 30, and the condenser lens 32 in the reconstruction beam optical system, and then enters the reconstruction light sensor 33.

Figure 5:
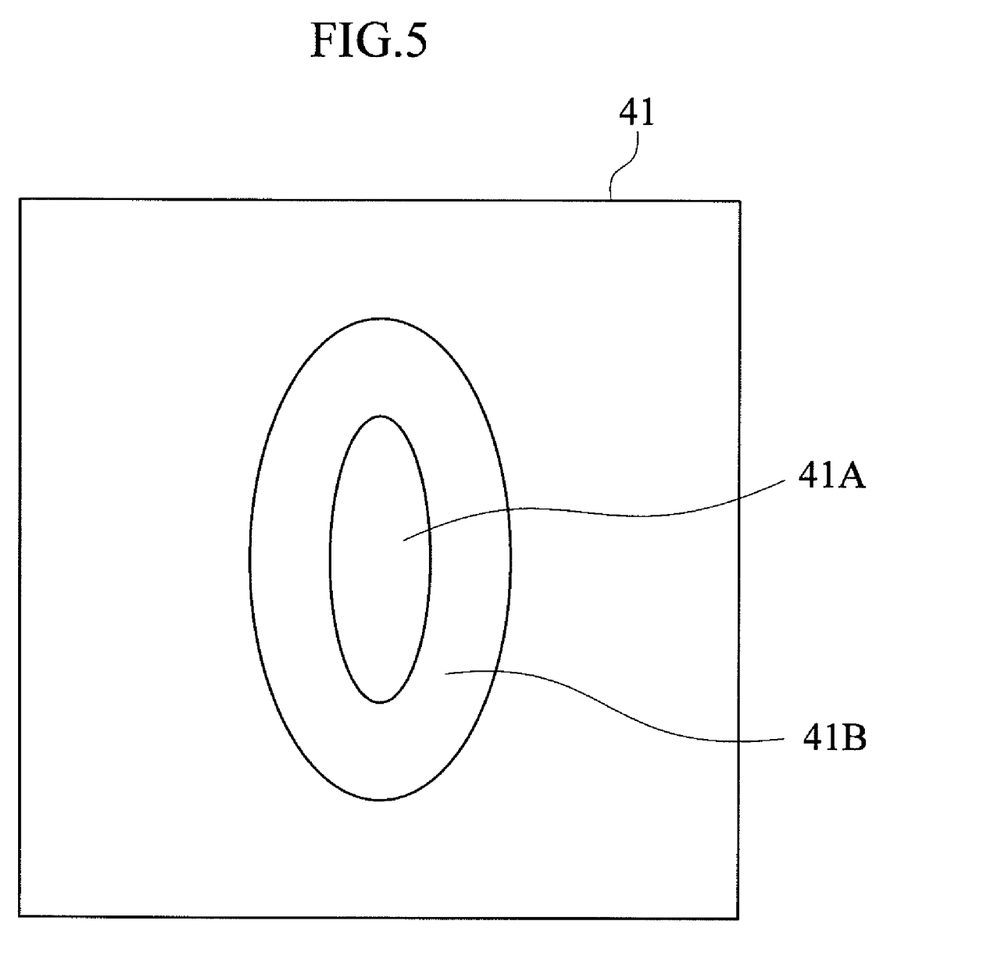
FIG. 5 is a plan view of the optical filter shown in FIG. 1.

The reference beam and other beams emitted from the spatial light modulator 20 in the cut-off direction (4θ angle with respect to the normal line of the main surface 20a) are concentrated by the wavefront reshaping condenser lens 40. The wavefront reshaping condenser lens 40 has a relatively long focal distance and is not an optically very high-performance lens. At the focal point of the condenser lens 40 is disposed the optical filter 41. The optical filter 41 is slanted with respect to a focal plane of the condenser lens 40. As shown in FIG. 5, the optical filter 41 is provided with a central transmissive part 41A which allows the beam to pass through to the wavefront reshaping collimator lens 42, and a peripheral reflective part 41B which provides a peripheral region around the central transmissive part 41A to reflect and direct the beam to the power-monitoring light sensor 62. The central transmissive part 41A is formed as small as a pinhole. Because of the combination of the wavefront reshaping condenser lens 40 and the optical filter 41, even the discretely thinned beam through the spatial light modulator 20 can be extracted by the central transmissive part 41A of the optical filter 41 as a low-frequency component beam having a reshaped wavefront, and this extracted beam is as uniform as the beam before entering the spatial light modulator 20 in terms of beam intensity distribution. The beam extracted by the central transmissive part 41A and traveling to the collimator lens 42 is used as the reference beam. On the other hand, the beam which has been extracted by the peripheral reflective part 41B and traveling to the power-monitoring light sensor 62 is used as a power monitoring beam having a high-frequency component.

The reference beam which has been made into a parallel beam by the wavefront reshaping collimator lens 42 is then reflected by the galvanomirror 50, passes through the object lens 51 in the reference beam optical system, and illuminates the hologram recording medium B. The galvanomirror 50 varies an entering angle of the reference beam with respect to the hologram recording medium B. At the time of recording, the signal beam and the reference beam are overlapped on the hologram recording layer 102 in the hologram recording medium B, where multiplex recording is made for holograms of different patterns according to their reference beam entering angle. At the time of reconstruction, different patterns of reconstruction beams are outputted in accordance with different entering angles of the reference beam, and in each time, the reconstruction beam is received by the reconstruction light sensor 33. Through this process, reading is made for the multiplexed information recorded in the form of holograms.

The power monitoring beam travels through the relay lenses 60, 61 and then is received by the power-monitoring light sensor 62. The power-monitoring light sensor 62 is used to monitor an output state of the light source 10 at the time of recording and reconstructing.

Next, the function of the hologram recorder A1 will be described.

It is assumed that the hologram recording is performed in the following conditions: the amount of beam at the light source 10 is 100%; the spatial light modulator 20 uses a 2-4 coding scheme; a ratio of the signal-beam transmitting area in the effective pixel area T is 25% (a ratio of the area transmitting the reference beam and the power monitoring beam is 75%); the fill factor of the beam reflection element 21 is 80%; a ratio between the amount of signal beam and the amount of reference beam that reach the hologram recording medium B is 1:2; and the beam loss caused by any other optical parts than the spatial light modulator 20 and the optical filter 41 are negligible.

In this case, the ideal amount of the signal beam reaching the hologram recording medium B is 20% of the initial amount of beam (100%) at the light source 10. Since the ratio in the amount of beam is 1:2, the amount of reference beam which reaches the hologram recording medium B is 40% of the amount of beam at the light source 10. The amount of beam which comes out of the spatial light modulator 20 and enters the wavefront reshaping condenser lens 40 (before being split into the reference beam and the power monitoring beam) is 60% of the amount of beam at the light source 10. Assuming that the amount of beam which becomes the power monitoring beam is 15%, the amount of beam lost by the optical filter 41 is 60−40−15=5%. The loss by the spatial light modulator 20 is 100−20−60=20%. Hence, the total loss by the spatial light modulator 20 and the optical filter 41 is 25%.

The beam loss (25%) in the present embodiment is remarkably smaller than that in the conventional recorder (48.6%). In addition, the amounts of signal beam and reference beam that can reach the hologram recording medium B are greater. Specifically, the amount of such signal beams is 20% by the present invention, while 12.1% by the conventional recorder, and the amount of such reference beams is 40% by the present invention, while 24.3% by the conventional recorder. Therefore, according to the present invention, a sufficient amount of signal beams and reference beams is used to illuminate the hologram recording medium B at the time of recording, ensuring reliable hologram recording with respect to the hologram recording layer 102.

At the time of recording and reconstructing, the beam extracted by the central transmissive part 41A of the optical filter 41 is directed as the reference beam to the hologram recording medium B. Since the reference beam has a uniform intensity distribution after being processed by the wavefront reshaping condenser lens 40 and by the optical filter 41, the beam does not adversely affect the light interference on the hologram recording medium B. In other words, the hologram recording can be performed through efficient interference between the reference beam and the signal beam. Likewise, at the time of reconstructing, the reference beam interferes efficiently with the recorded holograms to generate a reconstruction beam.

Therefore, according to the hologram recorder A1 offered by the present embodiment, efficient use is made as a reference beam and a power monitoring beam, of a beam which was thinned out in the cut-off direction, i.e. a direction not for the signal beam, in the process of a discrete signal beam by the spatial light modulator 20. Therefore, it is possible to reduce beam loss and thereby to increase beam utilization efficiency, and hence, it is possible to ensure that a sufficient amount of signal beam and reference beam will reach the hologram recording medium B, and thereby to make sure reliable recording and reconstructing of holograms.

The beam thinned out by the spatial light modulator in the cut-off direction may be used only as a reference beam.

FIG. 6 through 9 show hologram recorders according to other embodiments of the present invention. In these figures, those constituent elements which are identical or similar to those in the first embodiment will be indicated by the same reference symbols and their detailed description will be omitted.

Figure 6:
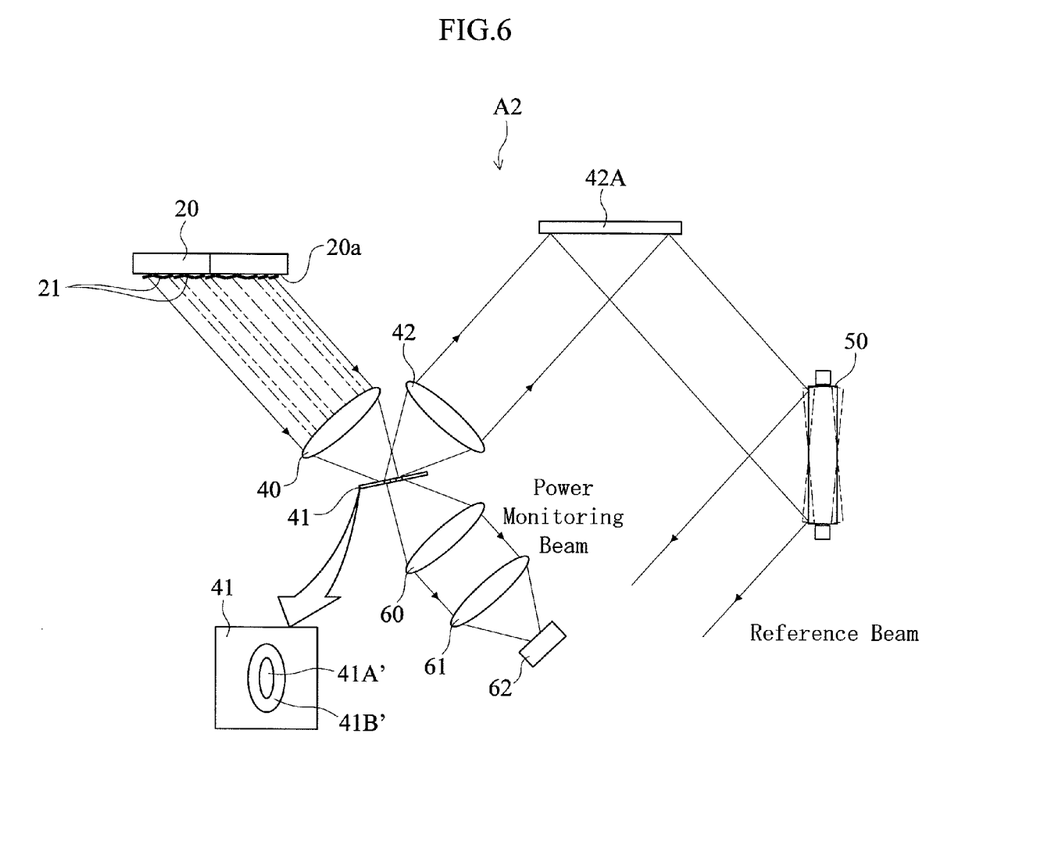
FIG. 6 shows the primary parts of a hologram recorder according to a second embodiment of the present invention.

As shown in FIG. 6, in a hologram recorder A2 according to the second embodiment, an optical filter 41 has a reverse construction from the one in the first embodiment. In other words, the optical filter 41 is provided with a central reflective part 41A' which reflects the beam to direct to the wavefront reshaping collimator lens 42, and a peripheral transmissive part 41B' which provides a peripheral region around the central reflective part 41A' to allow the beam to pass through to the power-monitoring light sensor 62. The central reflective part 41A' is formed as small as a pinhole. This combination of the wavefront reshaping condenser lens 40 and the optical filter 41 as described also makes it possible to extract a low-frequency component beam that has a reshaped wavefront at the central transmissive part 41A' of the optical filter 41, and this beam is as uniform as the beam before entering the spatial light modulator 20 in terms of beam intensity distribution. This beam which is extracted by the central transmissive part 41A' and travels to the collimator lens 42 is used as a reference beam. The reference beam is reflected by a reflector plate 42A, and then by the galvanomirror 50. The high-frequency, power monitoring beam which has been extracted by the peripheral transmissive part 41B' travels through the relay lenses 60, 61, and then is received by the power-monitoring light sensor 62.

The hologram recorder A2 as described above also provides the same advantages as provided by the first embodiment.

Figure 7:
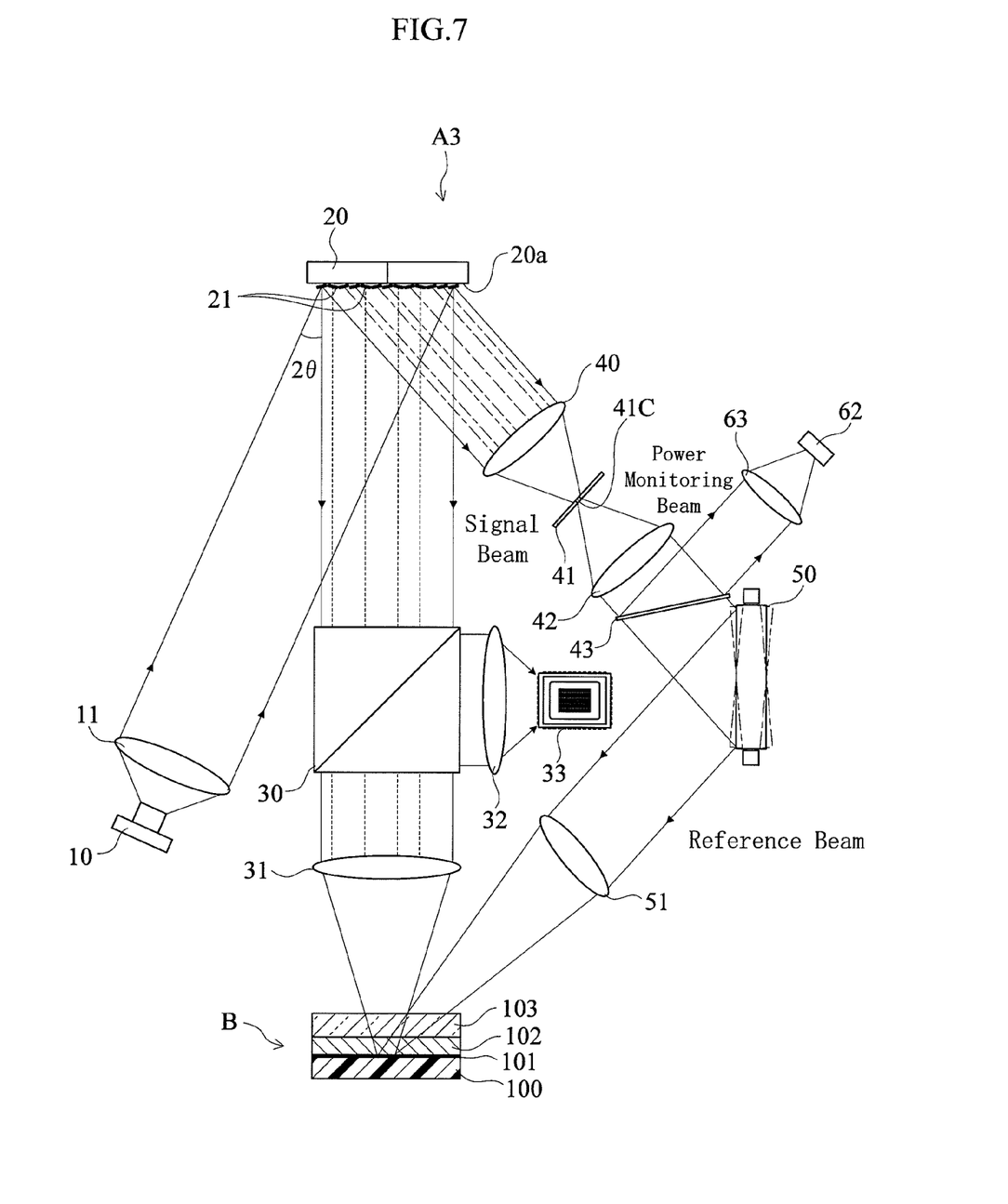
FIG. 7 is a schematic view showing the configuration of a hologram recorder according to a third embodiment of the present invention.

As shown in FIG. 7, a hologram recorder A3 according to a third embodiment includes an optical filter 41 which is placed in a focal plane of the wavefront reshaping condenser lens 40 and has a pinhole 41. Between the optical filter 41 and a galvanomirror 50, there is disposed a half mirror 43 which, after the beam has passed the pinhole 41C, separates the beam into a reference beam and a power monitoring beam.

According to the pinhole 41C in the optical filter 41, even the beam which has been discretely thinned by a spatial light modulator 20 is extracted as a low-frequency component beam that has a reshaped wavefront, and this beam is as uniform as the beam before entering the spatial light modulator 20 in terms of beam intensity distribution. After the pinhole 41C, the beam is made into a parallel beam by a collimator lens 42, and then separated into the reference beam and the power monitoring beam by the half mirror 43. The reference beam then reflects on the galvanomirror 50, passes through an object lens 51 in a reference beam optical system, and then illuminates the hologram recording medium B. The power monitoring beam passes through a condenser lens 63 of a power monitoring optical system, and then is received by a power-monitoring light sensor 62.

According to the hologram recorder A3 as described, efficient use is made as a reference beam and a power monitoring beam, of a beam which was thinned out in the cut-off direction, i.e. a direction not for the signal beam, by the spatial light modulator 20 and therefore, it is possible to reduce beam loss and thereby to increase beam utilization efficiency just as in the first embodiment, and hence, it is possible to reliably perform recording and reconstructing of holograms.

Figure 8:
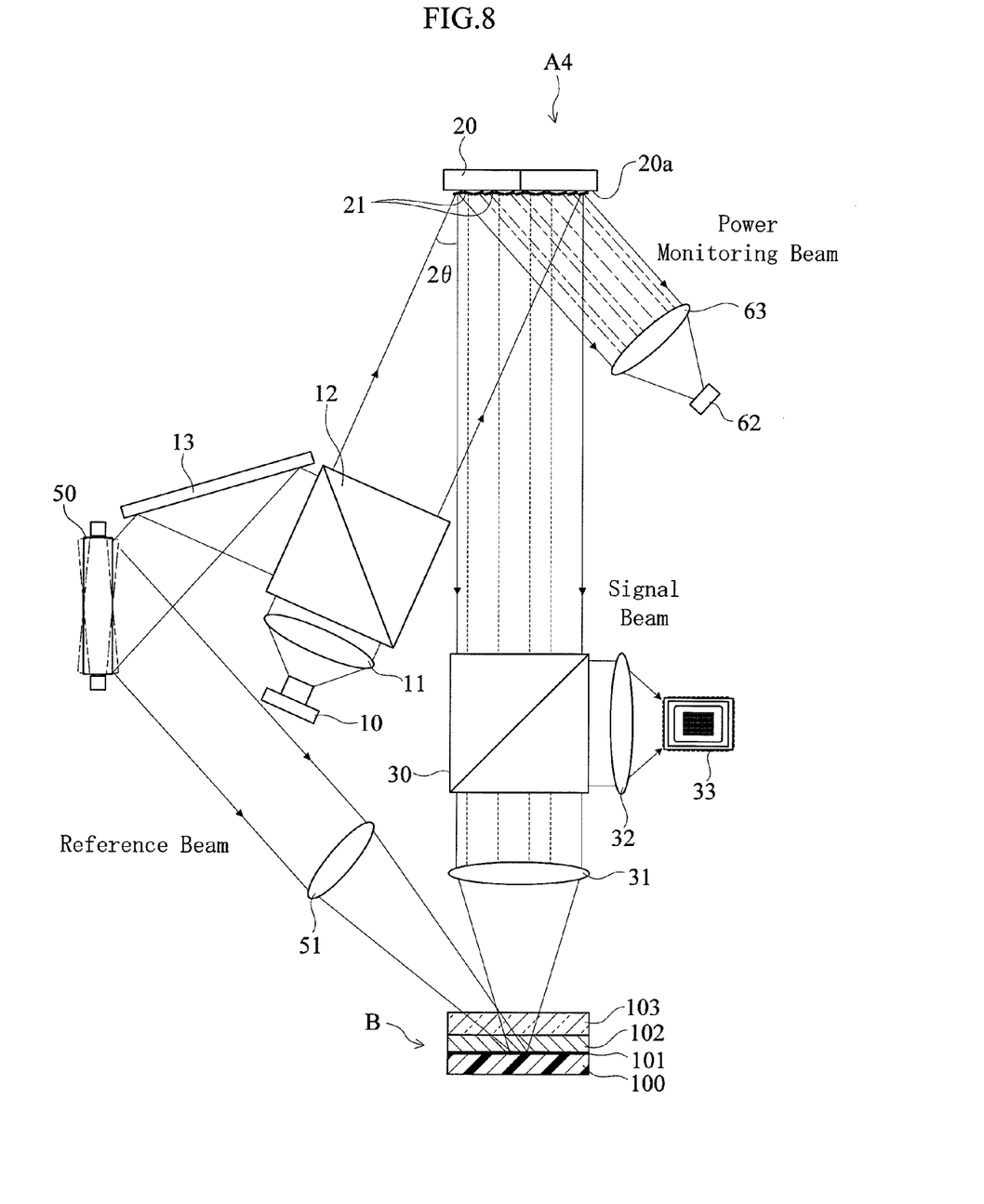
FIG. 8 is a schematic view showing the configuration of a hologram recorder according to a fourth embodiment of the present invention.

As shown in FIG. 8, a hologram recorder A4 according to a fourth embodiment includes a beam splitter 12 disposed between a collimator lens 11 and a spatial light modulator 20. A parallel beam which comes out of the collimator lens 11 is split by the beam splitter 12 in two directions: One beam travels to the spatial light modulator 20 while the other is used as a reference beam.

The reference beam which has been split by the beam splitter 12 reflects on a reflector plate 13, then on a galvanomirror 50, then passes through an object lens 51 in the reference beam optical system, and then illuminates the hologram recording medium B.

The beam which comes out of the beam splitter 12 and enters the spatial light modulator 20 has an angle of 2θ with respect to a normal line drawn to the main surface 20a. In the spatial light modulator 20, a beam which is reflected by a beam reflection element 21 at the ON angle +θ becomes a signal beam which travels in a main direction perpendicular to the hologram recording medium B. A beam which is reflected by the beam reflection element 21 at the OFF angle −θ is used as a power monitoring beam. The power monitoring beam travels in a cut-off direction at an angle of 4θ with respect to a normal line drawn to the main surface 20a, then passes through a condenser lens 63 of a power monitoring optical system, and then enters a power-monitoring light sensor 62. In other words, the beam which is thinned out by a spatial light modulator 20 in the cut-off direction, i.e. a direction which is not for the signal beam, is used as a power monitoring beam.

According to the hologram recorder A4 as described, the beam which is thinned out by a spatial light modulator 20 in the cut-off direction, i.e. a direction not for the signal beam, is effectively used as a power monitoring beam, and therefore, it is possible to reduce beam loss and thereby to increase beam utilization efficiency.

Figure 9:
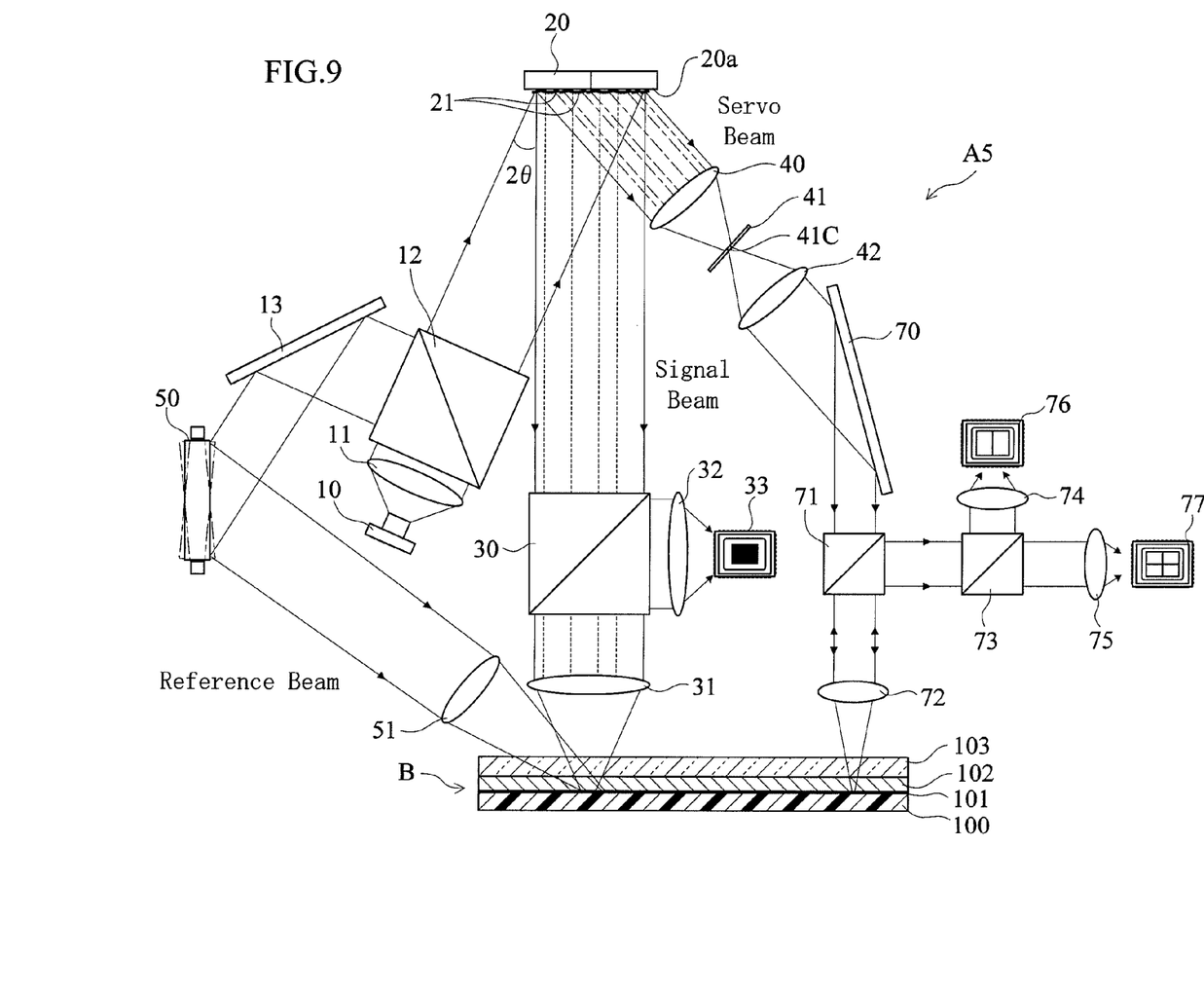
FIG. 9 is a schematic view showing the configuration of a hologram recorder according to a fifth embodiment of the present invention.

As shown in FIG. 9, a hologram recorder A5 according to a fifth embodiment has an arrangement that the beam which is thinned out by a spatial light modulator 20 in the cut-off direction, i.e. a direction not for the signal direction, is used as a servo beam. A servo mechanism is constituted by: a condenser lens 40, an optical filter 41 and a collimator lens 42 for wavefront reshaping purpose; and a reflector plate 70, a half mirror 71, an object lens 72, a beam splitter 73, beam-reception-purpose condenser lenses 74, 75, a dual-cell beam reception sensor 76, and a quad-cell beam reception sensor 77 of a servo optical system.

The servo beam is made into a parallel beam by the wavefront reshaping collimator lens 42, passes through the reflector plate 70, the half mirror 71, then the object lens 72 in the servo optical system, and then illuminates the hologram recording medium B. In the hologram recording medium B, the servo beam is reflected on the emboss pits (not illustrated), and the reflected servo beam travels through the object lens 72, the half mirror 71, and the servo optical system beam splitter 73, in this order. The beam splitter 73 splits the incoming servo beam into two directions. One of the beams split by the beam splitter 73 passes through the condenser lens 74, and then enters the dual-cell beam reception sensor 76 while the other beam passes through the condenser lens 75, and then enters the quad-cell beam reception sensor 77. An output signal from the dual-cell beam reception sensor 76 is used for track control and tilt control whereas an output from the quad-cell beam reception sensor 77 is used for focus control.

According to the hologram recorder A5 as described, the beam which is thinned out by the spatial light modulator 20 in the cut-off direction, i.e. a direction not for the signal beam, is effectively used as a servo beam, and therefore, it is possible to reduce beam loss and thereby to increase beam utilization efficiency.

The invention claimed is:

1. A hologram recorder comprising: a light source for emission of a coherent beam; a spatial light modulator including unit areas provided with beam reflection elements, respectively, each of the beam reflection elements configured to reflect the coherent beam from the light source in a main direction as a signal beam or in a cut-off direction; and a signal beam optical system for directing the signal beam to a hologram recording medium;

the hologram recorder further comprising:

a wavefront reshaper for concentration and wavefront reshaping of beams reflected in the cut-off direction by the beam reflection elements of the spatial light modulator;

a reference beam optical system for directing a beam from the wavefront reshaper to the hologram recording medium as a reference beam to overlap with the signal beam on the hologram recoding medium; and a power-monitoring light sensor for monitoring an output state of the light source;

wherein the wavefront reshaper includes a condenser lens for condensation of a beam, and an optical filter at a focal point of the condenser lens, and a collimator lens for collimating a beam from the optical filter, wherein the optical filter is provided with a central transmissive part and a peripheral reflective part around the central transmissive part, the central transmissive part allowing a beam of a low-frequency component to pass through to the collimator lens, the peripheral reflective part reflecting a beam of a high-frequency component to the power-monitoring light sensor.

* * * * *